United States Patent
Sütterlin et al.

(10) Patent No.: US 11,186,716 B2
(45) Date of Patent: Nov. 30, 2021

(54) POLYAMIDE MOULDING COMPOUND AND MOULDED ARTICLES PRODUCIBLE THEREFROM

(71) Applicant: EMS-PATENT AG, Domat/Ems (CH)

(72) Inventors: Martin Sütterlin, Chur (CH); Georg Stöppelmann, Bonaduz (CH); Ralf Hala, Lindenberg (DE); Ulrich Presenz, Trin (CH)

(73) Assignee: EMS-Patent AG, Domat/Ems (CH)

( * ) Notice: Subject to any disclaimer, the term of this patent is extended or adjusted under 35 U.S.C. 154(b) by 51 days.

(21) Appl. No.: 15/253,506

(22) Filed: Aug. 31, 2016

(65) Prior Publication Data

US 2017/0058123 A1 Mar. 2, 2017

(30) Foreign Application Priority Data

Aug. 31, 2015 (EP) .................................. 15183123

(51) Int. Cl.
| | | |
|---|---|---|
| C08L 77/06 | (2006.01) | |
| C08G 69/26 | (2006.01) | |
| C08L 77/02 | (2006.01) | |
| C08K 7/28 | (2006.01) | |
| C08L 51/06 | (2006.01) | |

(52) U.S. Cl.
CPC ............. *C08L 77/06* (2013.01); *C08G 69/26* (2013.01); *C08K 7/28* (2013.01); *C08L 51/06* (2013.01); *C08L 77/02* (2013.01)

(58) Field of Classification Search
CPC .......... C08L 77/00; C08L 77/02; C08L 77/04; C08L 77/06; C08L 77/08; C08L 77/10; C08G 69/02; C08G 69/08; C08G 69/10; C08G 69/12; C08G 69/14; C08G 69/22; C08G 69/26; C08K 7/26
See application file for complete search history.

(56) References Cited

U.S. PATENT DOCUMENTS

| | | | |
|---|---|---|---|
| 6,383,625 B1 * | 5/2002 | Shoshi ..................... | C08J 7/047 428/327 |
| 8,309,643 B2 | 11/2012 | Thullen et al. | |
| 8,324,297 B2 | 12/2012 | Hewel et al. | |
| 8,404,323 B2 | 3/2013 | Pfleghar et al. | |
| 8,552,103 B2 | 10/2013 | Rexin et al. | |
| 8,604,120 B2 | 12/2013 | Stöppelmann et al. | |
| 9,109,115 B2 | 8/2015 | Bühler | |
| 2007/0104943 A1 | 5/2007 | D'Souza | |
| 2007/0155858 A1 * | 7/2007 | Israelson ..................... | C08J 9/32 523/214 |
| 2008/0141902 A1 * | 6/2008 | Valenta ................. | C09D 133/14 106/287.2 |
| 2010/0144963 A1 * | 6/2010 | Buhler .................... | C08G 69/26 524/607 |
| 2011/0184099 A1 * | 7/2011 | Hewel .................. | C08G 69/265 524/101 |
| 2011/0220667 A1 * | 9/2011 | Pfleghar .................... | B32B 1/02 220/660 |
| 2012/0029133 A1 | 2/2012 | Stöppelmann et al. | |
| 2014/0088244 A1 | 3/2014 | Takeishi et al. | |
| 2014/0179849 A1 * | 6/2014 | Aepli ..................... | C08G 69/14 524/420 |
| 2014/0179850 A1 * | 6/2014 | Aepli ..................... | C08G 69/14 524/420 |
| 2014/0275392 A1 | 9/2014 | Bühler | |
| 2016/0295705 A1 * | 10/2016 | Stoeppelmann ......... | C08K 3/22 |
| 2018/0030270 A1 * | 2/2018 | Yalcin ..................... | C08K 9/06 |

FOREIGN PATENT DOCUMENTS

| | | |
|---|---|---|
| CN | 101 724 258 A | 6/2010 |
| CN | 103665853 A | 3/2014 |
| CN | 103881367 A | 6/2014 |
| EP | 2 365 033 A1 | 9/2011 |
| EP | 2 412 757 B1 | 11/2013 |
| EP | 2 778 190 B1 | 7/2015 |
| JP | 2003-238800 A | 8/2003 |
| JP | 2012-233087 A | 11/2012 |
| JP | 2013-538176 A | 10/2013 |
| JP | 2014-181341 A | 9/2014 |
| KR | 2013-0078776 A | 7/2013 |
| WO | WO 2011/073305 A1 | 6/2011 |
| WO | WO 2016/138113 A1 | 9/2016 |

OTHER PUBLICATIONS

3M, High strength low density, Jan. 2012, published online, p. 6 (Year: 2012).*
Sun et al., Terpolymerization of ethylene, propylene, and butene-1 with highly active supported titanium catalysts, Journal of Polymer Science, Part A: polymer chemistry, John Wiley & Sons, vol. 28, 1990, p. 1252 (Year: 1990).*
3M, "3M introduces new glass bubble filler for PP and PA systems", Additives for Polymers, Elsevier, Jun. 2012. (Year: 2012).*
Entec, "Grivory HB5299 EMS—Grivory Polyamide MXD6/MXDI" accessed Oct. 2, 2018, p. 1 (Year: 2018).*
Yalcin et al., 3M Glass Bubbles iM16K for Reinforced Thermoplastics, Apr. 2013. (Year: 2013).*
The Fusabond N493 technical datasheet from Dow Chemical Co. published online at https://www.dow.com/content/dam/dcc/documents/en-us/productdatasheet/914/914-08901-01-fusabond-n493-functional-polymer-tds.pdf (Year: 2020).*
Murphy, John. Additives for Plastics Handbook 2nd ed. Elsevier Science, 2001, p. 189 (Year: 2001).*
Meredith et al., "Property modification of thermoplastic plastics by the use of glass bubbles", Research Disclosure, Mason Publications, Hampshire, GB, vol. 253, No. 15 (1985)—1 pg.

(Continued)

*Primary Examiner* — Lee E Sanderson
(74) *Attorney, Agent, or Firm* — Leydig, Voit & Mayer, Ltd.

(57) ABSTRACT

The invention relates to a polyamide moulding compound consisting of an amorphous, microcrystalline or partially crystalline polyamide or mixtures hereof, at least one impact modifier, hollow glass balls and also further additives. The invention likewise relates to moulded articles produced from this polyamide moulding compound.

10 Claims, No Drawings

(56) References Cited

OTHER PUBLICATIONS

European Patent Office, Extended Search Report in European Patent Application No. 15 18 3123.7 (dated Jan. 12, 2016).
China National Intellectual Property Administration, First Office Action in Chinese Patent Application No. 201610772699.2 (dated Aug. 16, 2019).
U.S. Appl. No. 62/121,991, filed Feb. 27, 2015, Yalcin.
DuPont™ Fusabond® N493 resins Product Data Sheet (2 pgs.) 2014.
*Hollow Glass Microspheres for Plastics, Elastomers, and Adhesive Compounds*, First Edition, S.Amos, B. Yalcin, Editors, Elsevier, Table of Contents (2015).
*Hollow Glass Microspheres for Plastics, Elastomers, and Adhesive Compounds*, First Edition, S.Amos, B. Yalcin, Editors, Elsevier, pp. 1-105, 107-145, 147-227, 229-271, 273-280 (2015).
Kraton® FG-1901X Styrene Ethylene Butylene Styrene Block Copolymer, Product Data Sheet, Kraton Polymers LLC (1 pg.) 2010.
European Patent Office, Notice of Opposition filed in European Patent Application No. 15183123.7 (dated Aug. 7, 2018).
Japan Patent Office, Notice of Reasons for Refusal in Japanese Patent Application No. 2016-164434 (dated May 28, 2020).
Japan Patent Office, Notice of Reasons for Refusal in Japanese Patent Application No. 2016-164434 (dated Aug. 25, 2021).

\* cited by examiner

POLYAMIDE MOULDING COMPOUND AND MOULDED ARTICLES PRODUCIBLE THEREFROM

CROSS-REFERENCE TO A RELATED APPLICATION

This application claims the benefit of European Patent Application No. 15 183 123.7, filed Aug. 31, 2015, the disclosure of which is incorporated herein by reference in its entirety for all purposes.

The invention relates to a polyamide moulding compound consisting of an amorphous, microcrystalline or partially crystalline polyamide or mixtures hereof, at least one impact modifier, hollow glass balls and also further additives. The invention likewise relates to moulded articles produced from this polyamide moulding compound.

Reinforced polyamide moulding compounds provided with impact-resistance which optimise the properties, such as rigidity or toughness, are known from the state of the art. No attention is thereby paid to the weight of the part produced from the moulding compound.

Polyamide moulding compounds for the production of moulded articles with a soft-touch surface are known from EP 2 412 757 B1, which are formed from an amorphous polyamide and are additivated with impact modifiers and glass fibres for reinforcement. In addition to good mechanical properties, these polyamide moulding compounds enable the production of moulded articles with a so-called soft-touch surface which ensures excellent haptics, which is also of great importance in particular for portable electronic devices.

Polyamide moulding compounds which are formed from amorphous polyamides which are mixed with an impact modifier are known from EP 2 778 190 B1. These also have very good mechanical properties and, because of their transparency, can be used for spectacle parts but also for electronic devices, such as mobile phones.

The polyamide moulding compounds known from the state of the art generally in fact have good or very good mechanical properties, however this is often accompanied by a weight increase of the moulded articles because of the additives used for the reinforcement.

It was therefore the object of the present invention to provide polyamide moulding compounds which have very good mechanical properties and from which moulded articles which have low weight can be produced.

This object is achieved by the disclosed polyamide moulding compound and the moulded articles. Also disclosed are uses according to the above invention advantageous developments thereof.

According to the invention, a polyamide moulding compound is provided, which has a density of at most 0.970 g/cm$^3$, preferably of at most 0.945 g/cm$^3$, particularly preferably of at most 0.905 g/cm$^3$, and consists of the following components:
(a) 25 to 90% by weight, relative to the sum of components (a) to (d), of an amorphous, microcrystalline or partially crystalline polyamide or mixtures hereof,
(b) 5 to 30% by weight, relative to the sum of components (a) to (d), of at least one impact modifier,
(c) 5 to 30% by weight, relative to the sum of components (a) to (d), of hollow glass balls, and also
(d) 0 to 15% by weight, relative to the sum of components (a) to (d), of further additives.
Components (a) to (d) hereby add up to 100% by weight.

A preferred embodiment of the polyamide moulding compound according to the invention provides that component (a) has a density of at most 1.220 g/cm$^3$, preferably of at most 1.160 g/cm$^3$, particularly preferably of at most 1.100 g/cm$^3$, and very particularly preferably of at most 1.060 g/cm$^3$.

The spellings and abbreviations for polyamides and the monomers thereof are prescribed in the ISO standard 1874-1:2010. Thus the following abbreviations are used inter alia for diamines, MXD for m-xylylene diamine, MPMD for 2-methyl-1,5-pentane diamine, MOD for 2-methyl-1,8-octane diamine, MACM for bis(4-amino-3-methylcyclohexyl)methane, PACM for bis(4-aminocyclohexyl)methane, TMDC for bis(4-amino-3,5-dimethylcyclohexyl)methane, ND for 2,2,4-trimethylhexamethylene diamine and IND for 2,4,4-trimethylhexamethylene diamine.

If the polyamides comprise only diacids and diamines, then the molar proportions thereof add up to 50% by mol for the sum of all diamines and 50% by mol for the sum of all diacids and the sum of the diamine- and diacid proportions produces 100% by mol for the polyamide.

In the case of the quantity details for the diacids and diamines of the polyamides, it always applies that the sum of the molar proportions of all diamines is equal to the sum of the molar proportions of all diacids.

The quantity details with respect to the monomers should thereby be understood such that a corresponding molar ratio of these monomers used in the polycondensation is also found again in the polyamides produced in this way by polycondensation.

The amorphous or microcrystalline polyamide is preferably selected from the group consisting of PA 6I, PA 6I/6T, PA 6I/6T/6N, PA MXDI/6I, PA MXDI/MXDT/6I/6T, PA MXDI/12I, PA MXDI, PA MXDI/MXD6, PA MACM10, PA MACM12, PA MACM14, PA MACM18, PA NDT/INDT, PA TMDC10, PA TMDC12, PA TMDC14, PA TMDC18, PA PACM12, PA PACM14, PA PACM18, PA PACM10/11, PA PACM10/12, PA PACM12/612, PA PACM12/PACM14/612/614, PA MACMI/12, PA MACMT/12, PA MACMI/MACM12, PA MACMI/MACMN, PA MACMT/MACM12, PA MACMT/MACMN, PA MACM36, PA TMDC36, PA MACMI/MACM36, PA 6I/MACMI/12, PA MACMT/MACM36, PA MACMI/MACMT/12, PA 6I/6T/MACMI/MACMT, PA 6I/6T/MACMI/MACMT/12, PA MACM6/11, PA MACM6/12, PA MACM10/11, PA MACM10/12, PA MACM10/1010, PA MACM12/1012, PA MACM12/1212, PA MACM14/1014, PA MACM14/1214, PA MACM18/1018, PA 6I/6T/MACMI/MACMT/MACM12/612, PA 6I/6T/MACMI/MACMT/MACM12, PA MACMI/MACMT/MACM12/12, PA MACMI/MACMT/MACM12, PA 6I/6T/MACMI/MACMT/12, PA 6I/6T/6N/MACMI/MACMT/MACMN, PA TMDC12/TMDCT/TMDC36, PA TMDC12/TMDCI, PA TMDC12/TMDCI/TMDC36 and PA TMDC12/TMDCT and mixtures or copolymers hereof, the MACM being able to be replaced up to at most 35% by mol by PACM and/or TMDC, relative to the sum of the molar proportions of all monomers of 100% by mol, and/or the laurin lactam being able to be replaced entirely or partially by caprolactam.

The amorphous or microcrystalline polyamide is selected, particularly preferably, from the group consisting of PA MACM10, PA MACM12, PA MACM14, PA MACM18, PA TMDC10, PA TMDC12, PA TMDC14, PA TMDC18, PA PACM12, PA PACM14, PA PACM10/11, PA PACM10/12, PA PACM12/612, PA PACM12/PACM14/612/614, PA MACMI/12, PA MACMT/12, PA MACMI/MACM12, PA MACMT/MACM12, PA MACMI/MACMT/12, PA 6I/6T/

MACMI/MACMT, PA 6I/6T/MACMI/MACMT/12, PA MACM6/11, PA MACM6/12, PA MACM10/11, PA MACM10/12, PA MACM10/1010, PA MACM12/1012, PA MACM12/1212, PA MACM14/1014, PA MACM14/1214, PA MACM10/PACM10, PA MACM12/PACM12, PA MACM14/PACM14 and mixtures or copolymers hereof, the MACM being able to be replaced up to at most 35% by mol by PACM and/or TMDC, relative to the sum of the molar proportions of all monomers of 100% by mol, and/or the laurin lactam being able to be replaced entirely or partially by caprolactam.

The amorphous or microcrystalline polyamide is selected, very particularly preferably, from the group consisting of PA MACM12, PA MACM14, PA MACM18, PA TMDC12, PA TMDC14, PA PACM12, PA PACM14, PA PACM12/612, PA PACM12/PACM14/612/614, PA MACM10/1010, PA MACM12/1012, PA MACM12/1212, PA MACM14/1014, PA MACM14/1214, PA MACM10/PACM10, PA MACM12/PACM12, PA MACM14/PACM14 and mixtures or copolymers hereof.

The proportion of 1,6-hexane diamine in the PA PACM12/612 is preferably 2 to 45% by mol, particularly preferably 4 to 24% by mol, very particularly preferably 6 to 15% by mol, the sum of the molar proportions of all monomers producing 100% by mol. The polyamides PA PACM12/612 with at most 24% by mol of 1,6-hexane diamine are microcrystalline.

The proportion of 1,6-hexanediamine in the PA PACM12/PACM14/612/614 is preferably 2 to 45% by mol, particularly preferably 4 to 24% by mol, very particularly preferably 6 to 15% by mol, the sum of the molar proportions of all monomers producing 100% by mol. The proportion of 1,14 tetradecanedioic acid in the PA PACM12/PACM14/612/614 is preferably 2 to 45% by mol, particularly preferably 4 to 24% by mol, very particularly preferably 6 to 15% by mol, the sum of the molar proportions of all monomers producing 100% by mol. The polyamides PA PACM12/PACM14/612/614 with at most 24% by mol of 1,6-hexane diamine are microcrystalline.

The polyamides PA PACM12, PA PACM14 and PA PACM 18 are microcrystalline.

The proportion of the linearly aliphatic diamine in the PA MACM10/1010, PA MACM12/1012, PA MACM12/1212, PA MACM14/1014, PA MACM14/1214 is preferably 5 to 45% by mol, particularly preferably 8 to 27% by mol, very particularly preferably 10 to 22% by mol, the sum of the molar proportions of all monomers producing 100% by mol. The polyamides PA MACM10/1010, PA MACM12/1012, PA MACM12/1212, PA MACM14/1014, PA MACM14/1214 with at most 27% by mol of linearly aliphatic diamine are amorphous.

The proportion of PACM in the PA MACM10/PACM10, PA MACM12/PACM12 or PA MACM14/PACM14 is preferably 1 to 35% by mol, particularly preferably 2 to 25% by mol, the sum of the molar porportions of all monomers producing 100% by mol. The polyamides PA MACM10/PACM10, PA MACM12/PACM12 or PA MACM14/PACM14 with at most 25% by mol of PACM are amorphous.

The partially crystalline polyamide is preferably selected from the group consisting of PA 6, PA 46, PA 49, PA 410, PA 411, PA 412, PA 413, PA 414, PA 415, PA 416, PA 418, PA 436, PA 56, PA 510, PA 66, PA 69, PA 610, PA 611, PA 612, PA 613, PA 614, PA 615, PA 616, PA 617, PA 618, PA 1010, PA 66/6, PA 6/66/610, PA 6/66/12, PA 6/12, PA 11, PA 12, PA 912, PA 1212, PA MXD6, PA MXD9, PA MXD10, PA MXD11, PA MXD12, PA MXD13, PA MXD14, PA MXD15, PA MXD16, PA MXD17, PA MXD18, PA MXD36, PA PACM9, PA PACM10, PA PACM11, PA PACM12, PA PACM13, PA PACM14, PA PACM15, PA PACM16, PA PACM17, PA PACM18, PA PACM36, polyamides with a 4T repetition unit, polyamides with a 5T repetition unit, polyamides with a 6T repetition unit, polyamides with an 8T repetition unit, polyamides with a 9T repetition unit, polyamides with a 10T repetition unit, PA 4T/6T, PA 4T/8T, PA 6T/8T, PA 4T/MPMDT, PA 4T/4I, PA 5T/5I, PA 6T/6I, PA 9T/MODT, PA 9T/9I, PA 10T, PA 10T/6T, PA 10T/6T/10I/6I, PA 12T, PA MPMDT/6T, PA 10T/10I, PA 12T/12I, PA 4T/6T/8T, PA 4T/6T/10T, PA 4T/8T/10T, PA 6T/8T/10T, PA 4T/6T/MPMDT, PA 6T/6, PA 6T/66, PA 4T/66, PA 5T/66, PA 6T/6I/6, PA 10T/6T/1012/612, polyether amides, polyether ester amides, polyester amides and mixtures or copolymers thereof.

The partially crystalline polyamide is selected particularly preferably from the group consisting of PA 6, PA 66, PA 610, PA 611, PA 612, PA 1010, PA 1212, PA 66/6, PA 6/66/610, PA 6/66/12, PA 6/12, PA 11, PA 12 and mixtures or copolymers thereof.

The partially crystalline polyamide is selected, very particularly preferably, from the group consisting of PA 612, PA 1010, PA 1212, PA 11, PA 12 and mixtures or copolymers thereof.

The relative viscosity of the amorphous or microcrystalline polyamides is 1.35 to 2.15, preferably 1.40 to 2.05, particularly preferably 1.45 to 1.95, very particularly preferably 1.50 to 1.90, measured on a solution of 0.5 g of polyamide in 100 ml-cresol at 20° C.

The relative viscosity of the partially crystalline polyamides is 1.40 to 2.50, preferably 1.45 to 2.30, particularly preferably 1.60 to 2.15, measured on a solution of 0.5 g of polyamide in 100 ml-cresol at 20° C.

The amorphous or microcrystalline polyamides show, in dynamic differential scanning calorimetry (DSC) according to ISO 11357 at a heating rate of 20 K/min, preferably a melting heat of at most 50 J/g, particularly preferably of at most 25 J/g, very particularly preferably 0 to 22 J/g.

Microcrystalline polyamides are partially crystalline polyamides and therefore have a melting point. However, they have a morphology in which the crystallites have such a small dimension that a sheet produced therefrom with a thickness of 2 mm is still transparent, i.e. its light transmission is at least 75%, measured according to ASTM D 1003.

In the case of the microcrystalline polyamides used for the polyamide moulding compound according to the invention, the melting point, measured according to ISO 11537, is preferably at most 255° C.

The amorphous polyamides have, compared with the microcrystalline polyamides, a lower melting heat. The amorphous polyamides display, in dynamic differential scanning calorimetry (DSC) according to ISO 11357, at a heating rate of 20 K/min, preferably a melting heat of at most 5 J/g, particularly preferably of at most 3 J/g, very particularly preferably of 0 to 1 J/g.

Amorphous polyamides have no melting point because of their amorphicity.

Preferably, the amorphous or microcrystalline polyamide comprises at most 49% by mol, preferably at most 42% by mol, particularly preferably at most 38% by mol, of aromatic dicarboxylic acids, relative to the sum of all contained monomers of 100% by mol.

Preferably, the glass transition temperature of the amorphous or microcrystalline polyamide is 40 to 220° C., particularly preferably 60 to 200° C., very particularly preferably 105 to 170° C., measured according to ISO 11357.

It is particularly preferred if component (a) is free of monomers with an aromatic component.

In a particularly preferred embodiment of the polyamide moulding compound according to the invention, component (a) concerns mixtures of amorphous and/or microcrystalline polyamides with partially crystalline polyamides.

These mixtures of amorphous or microcrystalline polyamides with partially crystalline polyamides are preferably selected from the group consisting of mixtures of PA MACM12 with PA 12, of PA MACM12 with PA 612, of PA MACM14 with PA 12, of PA MACM14 with PA 612, of PA PACM12 with PA 12, of PA PACM12 with PA 612, of PA PACM14 with PA 12, of PA PACM14 with PA 612, of PA MACMI/12 with PA 12 and of PA 6I/6T/MACMI/MACMT/PACMI/PACMT with PA 12.

In the case of the mixtures of PA MACMI/12 with PA 12 and of PA 66I/6T/MACMI/MACMT/PACMI/PACMT with PA 12, the amorphous proportion is preferably 8 to 40% by weight, particular preferably 10 to 20% by weight, relative to 100% by weight for the total mixture.

In a particularly preferred embodiment of the mixture of PA MACM12 with PA 12, the PA 12 proportion is 2 to 30% by weight, preferably 5 to 25% by weight, particularly preferably 10 to 20% by weight, relative to 100% by weight for the total mixture.

For a further particularly preferred embodiment of the mixture of PA MACM12 with PA 12, the PA MACM12 proportion is 8 to 40% by weight, preferably 10 to 20% by weight, relative to 100% by weight for the total mixture.

In a further particularly preferred embodiment of the polyamide moulding compound according to the invention, component (a) concerns amorphous polyamides or microcrystalline polyamides or mixtures thereof.

The mixtures of amorphous or microcrystalline polyamides are preferably selected from the group consisting of mixtures of PA MACM12 with PA TMDC14, of PA MACM10 with PA TMDC14, of PA PACM12 with PA TMDC14 and of PA MACM10 with PA TMDC14.

In a further particularly preferred embodiment of the polyamide moulding compound according to the invention, component (a) concerns partially crystalline polyamides or mixtures thereof.

A preferred embodiment of the polyamide moulding compound according to the invention provides that the polyamide moulding compound is free of polymers which comprise acrylonitrile.

A further preferred embodiment of the polyamide moulding compound according to the invention provides that the polyamide moulding compound comprises from 43 to 83.9% by weight, in particular from 54 to 79.7% by weight, of component (a), respectively relative to the sum of components (a) to (d).

The at least one impact modifier is preferably selected from the group consisting of polyethylene, polypropylene, polyolefin copolymers, acrylate copolymers, acrylic acid copolymers, vinyl acetate copolymers, styrene copolymers, styrene block copolymers, ionic ethylene copolymers in which the acid groups are neutralised partially with metal ions, core-shell impact modifiers and mixtures thereof.

The polyamide moulding compound thereby preferably comprises from 7 to 25% by weight, in particular from 10 to 20% by weight, of the at least one impact modifier, respectively relative to the sum of components (a) to (d).

The at least one impact modifier preferably has a density of at most 1.000 g/cm$^3$, preferably of at most 0.950 g/cm$^3$, particularly preferably of at most 0.915 g/cm$^3$ and very particularly preferably of at most 0.890 g/cm$^3$.

The at least one impact modifier is preferably functionalised, either by copolymerisation or by grafting with unsaturated carboxylic acids, unsaturated carboxylic acid derivatives and/or unsaturated glycidyl compounds.

The at least one impact modifier can also be used in the form of a mixture or a blend of unfunctionalised and/or functionalised impact modifiers.

If the functionalisation is effected by copolymerisation, the weight proportion of each individual comonomer used for the functionalisation, i.e. of the unsaturated carboxylic acids, unsaturated carboxylic acid derivatives and/or unsaturated glycidyl compounds, is at 3 to 25% by weight, preferably at 4 to 20% by weight, particular preferably at 4.5 to 15% by weight, relative to the total impact modifier.

If the functionalisation is effected by grafting, advantageous functionalisation degrees, i.e. the weight proportions of the unsaturated carboxylic acids, unsaturated carboxylic acid derivatives and/or unsaturated glycidyl compounds, relative to the total impact modifier, is at 0.3 to 2.5% by weight, preferably at 0.4 to 2.0% by weight, particularly preferably at 0.5 to 1.9% by weight.

Impact modifiers functionalised by copolymerisation can in addition also be functionalised by grafting.

The unsaturated carboxylic acids, unsaturated carboxylic acid derivatives and/or unsaturated glycidyl compounds used for the functionalisation are preferably selected from the group consisting of unsaturated carboxylic acid esters, unsaturated carboxylic acid anhydrides, acrylic acid, methacrylic acid, glycidyl acrylic acid, glycidyl methacrylic acid, acrylic acid esters, methacrylic acid esters, alpha-ethylacrylic acid, maleic acid, maleic anhydride, fumaric acid, itaconic acid, citraconic acid, aconitic acid, tetrahydrophthalic acid and/or butenylsuccinic acid.

The conditions under which the copolymerisation or grafting takes place are common knowledge to the person skilled in the art.

The polyolefin copolymers are preferably selected from the group consisting of ethylene-α-olefin copolymers, propylene-α-olefin copolymers, ethylene-propylene copolymers, ethylene-propylene-diene copolymers and mixtures thereof, the α-olefins preferably having 3 to 18 carbon atoms. For particular preference, the α-olefins are selected from the group consisting of propene, 1-butene, 1-pentene, 1-hexene, 1-octene, 1-decene, 1-dodecene and mixtures thereof.

Examples of ethylene-α-olefin copolymers are linear polyethylenes with average densities (PE-LMD), linear polyethylenes with low densities (PE-LLD), linear polyethylenes with very low densities (PE-VLD), linear polyethylenes with ultra-low densities (PE-ULD), ethylene-propylene copolymers or ethylene-1-butene copolymers.

Amongst the ethylene-α-olefin copolymers, ethylene-propylene copolymers, ethylene-1-butene copolymers or ethylene-propylene-1-butene copolymers are preferred.

Amongst the ethylene-propylene-1-butene copolymers, copolymers in which the monomers ethylene e), propylene f) and 1-butene g) are used in the following molar proportions are preferred:
e) ethylene: 65-90% by mol, preferably 65-87% by mol, particularly preferably 71-84% by mol,
f) propylene: 8-33% by mol, preferably 10-25% by mol, particularly preferably 12-20% by mol, and also g) 1-butene: 2-25% by mol, preferably 3-20% by mol, particularly preferably 4-15% by mol, very particularly preferably 4-9% by mol, and components a) to g) adding up to 100% by mol.

The ethylene-propylene-1-butene copolymers can comprise the mentioned monomers d) to f) in the indicated preferred molar proportions, however included in the description ethylene-propylene-1-butene copolymer is likewise the possibility that a plurality of copolymers are mixed which respectively comprise two of the monomers e) to g), i.e. e) and f), e) and g) or f) and g), so that, in the mixture, the monomers e) to g) are present in the preferred molar proportions. Particularly preferably, such a mixture consists of a copolymer of monomers e) and f) and a copolymer of monomers e) and g) so that, in the mixture, the monomers e) to g) are present in the preferred molar proportions.

The acrylate copolymers, acrylic acid copolymers or vinyl acetate copolymers are preferably selected from the group consisting of ethylene-acrylic acid copolymers, ethylene-methacrylic acid copolymers, ethylene-methacrylic acid-acrylate copolymers, ethylene-acrylic acid-acrylate copolymers, ethylene-glycidyl-methacrylate copolymers, ethylene-acrylic acid ester-glycidyl-methacrylate copolymers, ethylene-vinyl acetate copolymers, ethylene-acrylate copolymers and mixtures thereof.

The styrene copolymers are preferably selected from the group consisting of styrene copolymers with butadiene, isoprene and acrylate.

The styrene block copolymers are preferably selected from the group consisting of styrene-butadiene-styrene triblock copolymers (SBS), styrene-isoprene-styrene triblock copolymers (SIS), styrene-ethylene/butylene-styrene triblock copolymer (SEBS) and styrene-ethylene/propylene-styrene triblock copolymer (SEPS).

The styrene-ethylene/butylene-styrene triblock copolymers concern linear triblock copolymers made of an ethylene/butylene block and two styrene blocks.

The styrene-ethylene/propylene-styrene triblock copolymers concern linear triblock copolymers made of an ethylene/propylene block and two styrene blocks.

The styrene proportion in the styrene-ethylene/butylene-styrene triblock copolymers or styrene-ethylene/propylene-styrene triblock copolymers is preferably 20 to 45% by weight, particularly preferably 25 to 40% by weight and very particularly preferably 25 to 35% by weight.

The styrene-ethylene/butylene-styrene triblock copolymers have preferably a melt-volume flow rate of 90 to 160 cm$^3$/10 min, particularly preferably of 100 to 150 cm$^3$/10 min and very particularly preferably of 110 to 140 cm$^3$/10 min. The melt-volume flow rate was measured at 275° C. and 5 kg according to ISO 1133.

The ionic ethylene copolymers consist preferably of ethylene, propylene, butylene, acrylic acid, acrylate, methacrylic acid and/or methacrylate in which the acid groups are neutralised partially with metal ions, particularly preferable are ethylene-methacrylic acid copolymers or ethylene-methacrylic acid-acrylate copolymers in which the acid groups are neutralised partially with metal ions. The metal ions used for the neutralisation concern preferably sodium-, zinc-, potassium-, lithium or magnesium ions, particularly preferably sodium-, zinc- or magnesium ions.

In the case of the core-shell impact modifiers, the core consists preferably of diene monomers, aromatic vinyl monomers, non-aromatic vinyl monomers and mixtures thereof and possibly crosslinking monomers. In the case of the core-shell impact modifiers, the shell consists preferably of aromatic vinyl monomers, non-aromatic vinyl monomers and mixtures thereof and possibly crosslinking monomers.

The diene monomers are selected preferably from the group consisting of butadiene and isoprene and mixtures thereof.

The aromatic vinyl monomers are preferably selected from the group consisting of styrene, α-methyl styrene, p-methyl styrene, ethyl styrene, tert.-butyl styrene, diphenyl ethylene, vinyl toluene, vinyl xylene, vinyl naphthalene, isopropenyl naphthalene, divinyl benzene, vinyl acetate, phenyl acrylate, phenyl methacrylate and mixtures thereof.

The non-aromatic vinyl monomers are preferably selected from the group consisting of acrylic acid, alkyl acrylates, methacrylic acid, alkyl methacrylates and mixtures thereof.

The non-aromatic vinyl monomers are preferably selected from the group consisting of acrylic acid, ethyl acrylate, propyl acrylate, n-butyl acrylate, isobutyl acrylate, 2-ethylhexyl acrylate, n-octyl acrylate, decyl acrylate, lauryl acrylate, stearyl acrylate, methacrylic acid, methyl methacrylate, ethyl methacrylate, propyl methacrylate, n-butyl methacrylate, isobutyl methacrylate, lauryl methacrylate, stearyl methacrylate, isobornyl methacrylate and mixtures thereof.

The crosslinking monomers are preferably selected from the group consisting of divinyl benzene, diallyl maleate, butylene glycol diacrylate, ethylene glycol dimethacrylate, allyl methacrylate and mixtures thereof.

If the copolymers used as impact modifiers comprise dienes as monomers, they are preferably used in hydrated, crosslinked or vulcanised form in the polyamide moulding compounds according to the invention.

In a particularly preferred embodiment of the polyamide moulding compound according to the invention, the impact modifier is selected from the group consisting of styrene-ethylene/butylene-styrene triblock copolymers with 20 to 45% by weight of styrene, grafted with 0.3 to 2.5% by weight of maleic anhydride, ethylene-propylene-1-butene copolymers in which the monomers ethylene e), propylene f) and 1-butene g) are used in the following molar proportions:

e) ethylene: 65-90% by mol, preferably 65-87% by mol, particularly preferably 71-84% by mol, f) propylene 8-33% by mol, preferably 10-25% by mol, particularly preferably 12-20% by mol, and also g) 1-butene: 2-25% by mol, preferably 3-20% by mol, particularly preferably 4-15% by mol, very particularly preferably 4-9% by mol, components e) to g) adding up to 100% by mol and the ethylene-propylene-1-butene copolymers being grafted with 0.3 to 2.5% by weight of maleic anhydride, and ethylene-1-butene copolymers grafted with 0.3 to 2.5% by weight of maleic anhydride.

In a particularly preferred embodiment of the polyamide moulding compound according to the invention, the impact modifier is selected from the group consisting of a styrene-ethylene/butylene-styrene triblock copolymer with 20 to 35% by weight of styrene, grafted with 1.4 to 1.9% by weight of maleic anhydride, ethylene-propylene-1-butene copolymers consisting of 71-84% by mol of ethylene e), 12-20% by mol of propylene f) and also 4-9% by mol of 1-butene g), components e) to g) adding up to 100% by mol and the ethylene-propylene-1-butene copolymers being grafted with 0.3 to 0.9% by weight of maleic anhydride, and ethylene-1-butene copolymers grafted with 0.9 to 1.5% by weight of maleic anhydride.

In a further particularly preferred embodiment of the polyamide moulding compound according to the invention, the impact modifier is selected from the group consisting of
- a styrene-ethylene/butylene-styrene triblock copolymer with 30% by weight of styrene, grafted with 1.7% by weight of maleic anhydride,
- a blend of ethylene-propylene copolymer and ethylene-1-butene copolymer in the weight ratio 67:33, grafted with 0.6% by weight of maleic anhydride, and
- an ethylene-1-butene copolymer grafted with 1.2% by weight of maleic anhydride.

Furthermore, it is preferred that the polyamide moulding compound comprises from 8 to 25% by weight, in particular from 10 to 20% by weight, respectively relative to the sum of components (a) to (d), of hollow glass balls.

The hollow glass balls hereby preferably have a pressure resistance of at least 100 MPa and particularly preferably of at least 110 MPa, measured according to ASTM D 3102-72 in glycerine. The hollow glass balls preferably have an average volumetric diameter ($d_{50}$) of 10 to 80 μm, preferably 13 to 50 μm, measured by means of laser diffraction according to ASTM B 822.

The hollow glass balls can be surface-treated. This can take place with a suitable sizing or adhesive system. For this purpose, for example systems based on fatty acids, waxes, silanes, titanates, polyamides, urethanes, polyhydroxy ethers, epoxides, nickel, more precisely combinations or mixtures thereof can be used. Preferably, the hollow glass balls are surface-treated with aminosilanes, epoxy silanes, polyamides or mixtures thereof.

Preferably, the hollow glass balls consist of borosilicate glass and are surface-treated with aminosilanes, epoxy silanes or polyamides, particularly preferably consist of sodium carbonate-calcium oxide-borosilicate glass and are surface-treated with aminosilanes, epoxy silanes or polyamides.

The theoretical density of the hollow glass balls is preferably 0.10 to 0.65 g/cm$^3$, particularly preferably 0.20 to 0.55 g/cm$^3$, very particularly preferably 0.30 to 0.50 g/cm$^3$, measured according to ASTM D 2840-69 with a gas pycnometer and helium as measuring gas.

Test pieces produced from the polyamide moulding compound have preferably an impact strength according to Charpy, measured according to ISO 179, of at least 30 kJ/m$^2$, preferably of at least 50 kJ/m$^2$ and particularly preferably of at least 60 kJ/m$^2$ and/or a modulus of elasticity in tension of at least 750 MPa, preferably 1,200 MPa and particularly preferably 1,650 MPa and/or a tearing strength of at least 20 MPa, preferably 30 MPa and particularly preferably 40 MPa and/or a breaking elongation of at least 3%, preferably at least 5% and particularly preferably 11%, measured respectively according to ISO 527.

The advantage of using hollow glass balls for reducing the density of the polyamide moulding compound relative to using impact modifiers resides in the fact that the hollow glass balls do not lower the modulus of elasticity in tension of the resulting polyamide moulding compound, but rather, in contrast, raise it somewhat.

The polyamide moulding compound can comprise additives in addition, which are selected preferably from the group consisting of inorganic stabilisers, organic stabilisers, in particular antioxidants, antiozonants, light-protecting means, UV stabilisers, UV absorbers or UV blockers, IR absorbers, NIR absorbers, anti-blocking agents, nucleation agents, crystallisation accelerators, crystallisation retardants, condensation catalysts, chain regulators, defoamers, chain-lengthening additives, conductivity additives, separation means, lubricants, colourants, marking agents, inorganic pigments, organic pigments, carbon black, graphite, carbon nanotubes, graphene, carbon fibres, titanium dioxide, zinc sulphide, zinc oxide, barium sulphate, photochromic agents, anti-static agents, mould-release agents, optical brighteners, halogen-free flame retardants, metallic pigments, metallic flakes, metal-coated particles, filling- and reinforcing materials, natural layer silicates, synthetic layer silicates and mixtures thereof.

The polyamide moulding compounds according to the invention are distinguished, in addition to the low density and good mechanical properties, in particular good toughness, also by a series of improved properties, such as increased shape stability or dimensional stability, abrasion resistance, surface hardness, flowability of the melt, insulating capability, both relative to temperature and noise, low and also isotropic shrinkage and reduced heat expansion.

Suitable processing methods for the polyamide moulding compounds according to the invention are injection moulding, extrusion, stratification, lamination, backing and extrusion blow-moulding.

The polyamide moulding compounds according to the invention are suitable for the production of moulded articles, such as foils, profiles, pipes, containers, semi-finished products, finished parts or hollow articles and also for coating moulded articles.

The polyamide moulding compounds according to the invention can be used primarily in the fields of industry, domestic, sanitary, optical, clocks, electric, electronic, electro-optical, vehicles, engineering, fashion, sport and leisure, measuring and testing means and toys.

According to the invention, moulded articles are likewise provided which are producible from the previously described polyamide moulding compounds. These moulded articles are selected preferably from the group consisting of spectacle parts, in particular spectacle mountings, spectacle frames, spectacle side pieces, in particular for safety goggles, sports goggles or ski goggles, sports appliances, in particular ski boots, cross-country ski boots, snowboarding boots or helmets, housings, housing parts, frames, protective housings, coverings or coating elements, in particular for electrical appliances, electronic devices, electro-optical devices, electro-optical components, office automation devices, entertainment electronics, portable computers, in particular laptops, notebooks, netbooks and tablet PCs, play consoles, navigation devices, measuring devices, personal digital assistants, telecommunication devices, cameras, watches, clocks, computers, electronic memory devices, keyboards, music recorders, digital music playback devices (e.g. CD- and MP3 players), eBooks, mobile phones or smart phones.

The polyamide moulding compounds according to the invention are opaque, i.e. lightproof and hence non-transparent.

Production of the Polyamide Moulding Compound According to the Invention

For the production of the polyamide moulding compound according to the invention, components a) to c) and possibly d) are mixed on normal compounding machines, such as e.g. single- or twin-screw extruders or screw kneaders. Components a) to c) and possibly d) are thereby metered, individually via gravimetric metering scales, into the feed or respectively into a side feeder or supplied in the form of a dry blend. Component c) (hollow glass balls) is preferably metered into the polymer melt via a side feeder.

If additives (component d)) are used, these can be introduced directly or in the form of a master batch. The carrier material of the master batch preferably concerns a polyolefin or a polyamide. Amongst the polyamides, in particular the polyamide of the respective components a), PA 6, PA 11, PA 12, PA 69, PA 6/69 or PA 6/12 are particularly suitable for this purpose.

For the dry blend production, the dried granulates of components a) and/or b) and possibly further additives (component d)) are mixed in a closed container. This mixture is homogenised for 10-40 min by means of a tumble mixer, drum hoop mixer or tumble dryer. In order to avoid absorption of moisture, this can be effected under dry protective gas.

The compounding is effected at set cylinder temperatures of 200 to 350° C., the temperature of the first cylinder being able to be set below 200° C. A vacuum can be applied in front of the nozzle or it can be atmospherically degassed. The melt is discharged in strand form, cooled in the water bath at 10 to 80° C. and subsequently granulated. The granulate is dried for 12 to 24 hours at 80 to 120° C. under nitrogen or in a vacuum to a water content of below 0.1% by weight.

Processing of the polyamide moulding compounds according to the invention in injection moulding is effected at cylinder temperatures of 200 to 350° C. and mould temperatures of 40 to 140° C.

The subject according to the invention is intended to be described in more detail with reference to the following examples, without wishing to restrict said subject to the specific embodiments shown here.

In table 1 and 2, the components used in the examples and comparative examples are listed.

The hollow glass balls (c1) and (c2) were provided with an aminosilane size before use.

TABLE 1

| Components | Description | Manufacturer |
|---|---|---|
| Polyamide (a1) | amorphous polyamide MACM12 made of bis(3-methyl-4-aminocyclohexyl)methane and dodecanedioic acid<br>RV* 1.70 (measured with 0.5 g in 100 ml m-cresol at 20° C.)<br>glass transition temperature 155° C.<br>density 1.00 g/cm$^3$ | EMS-CHEMIE AG, Switzerland |
| Polyamide (a2) | amorphous polyamide MACMI/MACMT/12 in the molar ratio 38/38/24 made of bis(3-methyl-4-aminocyclohexyl)methane, isophthalic acid, terephthalic acid and laurin lactam<br>RV* 1.53 (measured with 0.5 g in 100 ml m-cresol at 20° C.)<br>glass transition temperature 194° C.<br>density 1.06 g/cm$^3$ | EMS-CHEMIE AG, Switzerland |
| Polyamide (a3) | polyamide 612 made of 1,6-hexane diamine and 1,12-dodecanedioic acid<br>RV* 1.79 (measured with 0.5 g in 100 ml m-cresol at 20° C.)<br>melting point 220° C.<br>density 1.06 g/cm$^3$ | EMS-CHEMIE AG, Switzerland |
| Polyamide (a4) | polyamide 1010 made of 1,10-decane diamine and 1,10-decanedioic acid<br>RV 1.54 (measured with 0.5 g in 100 ml m-cresol at 20° C.)<br>melting point 200° C.<br>density 1.05 g/cm$^3$ | EMS-CHEMIE AG, Switzerland |
| Polyamide (a5) | PA 12 made of laurin lactam<br>RV 2.10 (measured with 0.5 g in 100 ml m-cresol at 20° C.)<br>melting point 178° C.<br>density 1.01 g/cm$^3$ | EMS-CHEMIE AG, Switzerland |
| Polyamide (a6) | PA 12 made of laurin lactam<br>RV 1.65 (measured with 0.5 g in 100 ml m-cresol at 20° C.)<br>melting point 178° C.<br>density 1.01 g/cm$^3$ | EMS-CHEMIE AG, Switzerland |
| SEBS-MAH (b1) | styrene-ethylene/butylene-styrene block copolymer with 30% by weight of styrene<br>1.7% by weight of maleic anhydride<br>MVR**** 130 cm$^3$/10 min at 275° C. and 5 kg<br>density 0.910 g/cm$^3$<br>Trade name Kraton FG1901 GT | Kraton Polymers LLC, USA |

TABLE 2

| Components | Description | Manufacturer |
|---|---|---|
| E/P-E/B-MAH (b2) | blend of ethylene/propylene copolymer and ethylene-but-1-ene copolymer in the weight ratio 67:33<br>approx. 81% by mol of ethylene<br>0.6% by weight of maleic anhydride<br>MVR**** 13 cm$^3$/10 min at 275° C. and 5 kg<br>density 0.875 g/cm$^3$<br>Trade name Tafmer MC201 | Mitsui Chemicals, Japan |
| E/B-g-MAH (b3) | ethylene-1-butene copolymer<br>1.2% by weight maleic anhydride<br>density 0.866 g/cm$^3$<br>MFR 1.2 g/10 min at 230° C. and 2.16 kg measured according to ASTM D 1238<br>Trade name Tafmer MH5020C | Mitsui Chemicals, Japan |
| Hollow glass balls (c1) | hollow glass balls made of sodium carbonate-calcium oxide-borosilicate glass | 3M Deutschland GmbH, Germany |

TABLE 2-continued

| Components | Description | Manufacturer |
|---|---|---|
| | pressure resistance** 110 MPa<br>average ball diameter*** 20 μm<br>theoretical density***** 0.46 g/cm³<br>Trade name iM16K | |
| Hollow glass balls (c2) | hollow glass balls made of sodium carbonate-calcium oxide-borosilicate glass<br>pressure resistance ** 60 MPa<br>average ball diameter *** 50 μm<br>theoretical density ***** 0.60 g/cm³<br>Trade name Cenostar C-60 | Cenostar Corporation, USA |
| Heat stabiliser (d1) | bis[3,3-bis-(4'hydroxy-3'-tert-butyl-phenyl)butanoic acid]glycol ester<br>CAS-no. 32509-66-3<br>Trade name Hostanox O 3 P | Clariant Produkte (Deutschland) GmbH, Germany |
| Heat stabiliser (d2) | tetrakis(2,4-di-tert-butylphenyl)-4,4'-biphenyldiphosphonite<br>CAS-no. 119345-01-6<br>Trade name Hostanox P-EPQ | Clariant Produkte (Deutschland) GmbH, Germany |
| UV-stabiliser (d3) | N-(2-ethoxyphenyl)-N'- (2-ethylphenyl)ethane diamine<br>CAS-no. 23949-66-8<br>Trade name Tinuvin 312 | BASF Schweiz AG, Schweiz |
| UV-stabiliser(d4) | polymer made of 2,2,4,4-tetramethyl-7-oxa-3,20-diazadispiro[5.1.11.2]-henicosan-21-one and epichlorohydrin<br>CAS-no. 202483-55-4<br>Trade name Hostavin N 30 P | Clariant Produkte (Deutschland) GmbH, Germany |
| TiO₂-master batch (d5) | 50% by weight of titanium dioxide (TiO₂) in PA 12<br>Trade name Sukano TA28-10 MB05 | Sukano AG, Switzerland |

*RV relative viscosity, measured on a solution of 0.5 g polyamide in 100 ml m-cresol at 20° C.
**90% by vol. of undestroyed hollow glass balls, measured according to ASTM D 3102-72 in glycerine
***volumetric $d_{50}$ value, measured with laser diffraction according to ASTM B 822
****melt volume rate
*****theoretical density, measured in a gas pycnometer according to ASTM D 2840-69

Production of the Polyamide Moulding Compound of Example 3

The dried granulate of polyamide (a1) was mixed together with the additives (d1) to (d4) to form a dry blend, and in fact in the ratio indicated in table 2. This mixture was homogenised for approx. 20 minutes by means of a tumble mixer.

The polyamide moulding compound was produced on a twin-screw extruder of the company Werner and Pfleiderer type ZSK 25 in the ratio indicated in table 2. The dry blend was thereby metered into the feed via metering scales. The impact modifier (b2) was likewise metered into the feed via metering scales. The hollow glass balls (c1) were metered into a side feeder via metering scales, which side feeder conveyed the hollow glass balls (c1) six housing units in front of the nozzle into the melt.

The temperature of the first housing was set to 100° C., that of the remaining housings to 270 to 300° C. A speed of rotation of 250 rpm and a throughput of 10 kg/h was used and this was atmospherically degassed. The strands were cooled in the water bath, cut and the obtained granulate was dried at 100° C. for 24 h in a vacuum (30 mbar) to a water content below 0.1% by weight.

Production of the Test Pieces

The test pieces were produced on an injection moulding machine of the company Arburg, Model Allrounder 420 C 1000-250. Cylinder temperatures rising from 225° C. to 295° C. were thereby used for production of the moulded articles from the polyamide moulding compounds of examples 1 to 7 and comparative examples 8 to 9. The mould temperature was 80° C. For production of the moulded articles made of the polyamide moulding compounds of examples 10 to 16, cylinder temperatures rising from 250° C. to 270° C. were used. The mould temperature was 50° C.

The test pieces were used in the dry state; for this purpose, they were stored, after the injection moulding, for at least 48 h at room temperature in a dry environment, i.e. over silica gel.

Measuring Methods Used in this Application:
Modulus of Elasticity in Tension:
ISO 527 with a tensile speed of 1 mm/min
ISO tension bar, standard: ISO/CD 3167, type A1, 170×20/10×4 mm,
Temperature 23° C.
Tensile Strength and Elongation at Break:
ISO 527 with a tensile speed of 5 mm/min
ISO test piece, standard: ISO/CD 3167, type A1, 170×20/10×4 mm,
Temperature 23° C.
Impact Strength According to Charpy:
ISO 179/*eU
ISO test piece, standard: ISO/CD 3167, type B1, 80×10×4 mm,
Temperature 23° C.
*1=not instrumented, 2=instrumented
Notch Impact Strength According to Charpy;
ISO 179/*eA
ISO test piece, standard: ISO/CD 3167, type B1, 80×10×4 mm,
Temperature 23° C.
*1=not instrumented, 2=instrumented
Relative Viscosity:
ISO 307
Granulate
0.5 g in 100 ml m-cresol
Temperature 20° C.
Calculation of the relative viscosity (RV) according to $RV=t/t_0$ following section 11 of the standard
Melting Point, Melting Heat and Glass Transition Temperature (Tg):
ISO 11357
Granulate
Differential scanning calorimetry (DSC) was implemented with a heating rate of 20 K/min. At the melting point, the temperature is indicated at the peak maximum. The centre of the glass transition range which is indicated as glass transition temperature (Tg) was determined according to the "half-step-height" method.

Density:
ISO 1183-3:1999
ISO test piece, standard: ISO/CD 3167, type B1, 80×10×4 mm
Temperature 23° C.
The ISO test piece is divided roughly into three so that the parts fit in the measuring chamber of the gas pycnometer. Helium is used as measuring gas.

MVR (Melt-Volume Flow Rate):
ISO 1133
Granulate
Temperature and loading 275° C. and 5 kg Light Transmission:
ASTM D1003
Plate, thickness 2 mm, 60×60 mm, produced in a highly-polished mould
Temperature 23° C.
Measuring apparatus Haze Gard plus of the company Byk Gardner CIE light type C. The light transmission value is indicated in % of the irradiated quantity of light.

In table 3, test pieces produced from the polyamide moulding compounds according to the invention were compared with test pieces made of non-inventive polyamide moulding compounds, with respect to the mechanical properties.

The comparison between the moulding compounds of example 1 and comparative example 8 or between the moulding compounds of example 2 and comparative example 9 reveals unequivocally that the density of the polyamide moulding compound can be reduced only when using hollow glass balls with sufficient pressure resistance.

The moulding compound of example 3 with the functionalised mixture of two ethylene copolymers as impact modifier shows very good mechanical properties, above all excellent toughness, in this case measured as impact strength or elongation at break.

The moulding compounds of examples 4 to 7 show the excellent effect of the combination of impact modifier and hollow glass balls for density reduction in the case of polyamide moulding compounds.

The moulding compounds of examples 10 to 16 (table 4) produced with PA 12 or a mixture of the partially crystalline PA 12 and the amorphous PA MACM12 as component a) show an excellent combination of low density and high toughness, in this case measured as notch impact strength or breaking elongation.

In table 5, moulding compounds 17 and 18 in which an impact modifier was dispensed with are shown. These comparative examples show significantly poorer mechanical properties.

TABLE 3

| | | Examples | | | | | | | Comparative examples | |
|---|---|---|---|---|---|---|---|---|---|---|
| | Unit | 1 | 2 | 3 | 4 | 5 | 6 | 7 | 8 | 9 |
| Components | | | | | | | | | | |
| PA MACM12 (a1) | % by wt. | 79 | 64 | 79 | — | — | — | — | 79 | 64 |
| PA MACMI/MACMT/12 (a2) | % by wt. | — | — | — | 79 | 79 | — | — | — | — |
| PA 612 (a3) | % by wt. | — | — | — | — | — | 79 | — | — | — |
| PA 1010 (a4) | % by wt. | — | — | — | — | — | — | 79 | — | — |
| SEBS-MAH (b1) | % by wt. | 10 | 20 | — | 10 | 20 | 10 | 10 | 10 | 20 |
| E/P-E/B-MAH (b2) | % by wt. | — | — | 10 | — | — | — | — | — | — |
| Hollow glass balls (c1) | % by wt. | 10 | 15 | 10 | 10 | 15 | 10 | 10 | — | — |
| Hollow glass balls (c2) | % by wt. | — | — | — | — | — | — | — | 10 | 15 |
| Heat stabiliser (d1) | % by wt. | 0.5 | 0.5 | 0.5 | 0.5 | 0.5 | 0.5 | 0.5 | 0.5 | 0.5 |
| Heat stabiliser (d2) | % by wt. | 0.1 | 0.1 | 0.1 | 0.1 | 0.1 | 0.1 | 0.1 | 0.1 | 0.1 |
| UV stabiliser (d3) | % by wt. | 0.3 | 0.3 | 0.3 | 0.3 | 0.3 | 0.3 | 0.3 | 0.3 | 0.3 |
| UV stabiliser (d4) | % by wt. | 0.1 | 0.1 | 0.1 | 0.1 | 0.1 | 0.1 | 0.1 | 0.1 | 0.1 |
| Tests | | | | | | | | | | |
| Density | g/cm$^3$ | 0.916 | 0.845 | 0.900 | 0.940 | 0.882 | 0.937 | 0.895 | 0.990 | 0.977 |
| Modulus of elasticity in tension | MPa | 1,680 | 1,480 | 1,720 | 2,220 | 1,980 | 2,210 | 1,720 | 1,540 | — |
| Tearing strength | MPa | 42 | 33 | 41 | 56 | 45 | 38 | 43 | 38 | — |
| Breaking elongation | % | 11 | 6 | 16 | 6 | 4 | 5 | 13 | 10 | — |
| Impact strength, Charpy 23° C. | kJ/m$^2$ | 66 | 38 | 115 | 50 | 33 | 60 | 65 | 49 | — |

TABLE 4

|  | Unit | \multicolumn{7}{c}{Examples} |
| --- | --- | --- | --- | --- | --- | --- | --- | --- |
|  |  | 10 | 11 | 12 | 13 | 14 | 15 | 16 |
| Components |  |  |  |  |  |  |  |  |
| PA 12 (a5) | % by wt. | 54 | 43 | 54 | 43 | 43 | 43 | 47 |
| PA 12 (a6) | % by wt. | 18 | 14 | 18 | 14 | 14 | 14 | 15 |
| PA MACM12 (a1) | % by wt. | — | — | — | — | 10 | 10 | — |
| E/P-E/B-MAH (b2) | % by wt. | — | — | 15 | 30 | — | 20 | 30 |
| E/B-MAH (b3) | % by wt. | 15 | 30 | — | — | 20 | — | — |
| Hollow glass balls (c1) | % by wt. | 10 | 10 | 10 | 10 | 10 | 10 | 5 |
| Heat stabiliser (d1) | % by wt. | 0.5 | 0.5 | 0.5 | 0.5 | 0.5 | 0.5 | 0.5 |
| Heat stabiliser (d2) | % by wt. | 0.1 | 0.1 | 0.1 | 0.1 | 0.1 | 0.1 | 0.1 |
| UV stabiliser (d3) | % by wt. | 0.3 | 0.3 | 0.3 | 0.3 | 0.3 | 0.3 | 0.3 |
| TiO2 masterbatch (d5) | % by wt. | 2.0 | 2.0 | 2.0 | 2.0 | 2.0 | 2.0 | 2.0 |
| Tests |  |  |  |  |  |  |  |  |
| Density | g/cm$^3$ | 0.889 | 0.870 | 0.888 | 0.873 | 0.881 | 0.885 | 0.895 |
| Modulus of elasticity in tension | MPa | 1,450 | 1,050 | 1,400 | 850 | 1,240 | 1,310 | 790 |
| Tearing strength | MPa | 32 | 25 | 32 | 22 | 26 | 27 | 25 |
| Breaking elongation | % | 95 | 130 | 30 | 140 | 50 | 65 | 160 |
| Notch impact strength, Charpy 23° C. | kJ/m$^2$ | 28 | 41 | 24 | 43 | 35 | 33 | 53 |

TABLE 5

|  |  | \multicolumn{2}{c}{Comparative examples} |
| --- | --- | --- | --- |
|  | Unit | 17 | 18 |
| Components |  |  |  |
| PA MACM12 (a1) | % by wt. | 89 | — |
| PA 12 (a5) | % by wt. | — | 87 |
| Hollow glass balls (c1) | % by wt. | 10 | 10 |
| Heat stabiliser (d1) | % by wt. | 0.5 | 0.5 |
| Heat stabiliser (d2) | % by wt. | 0.1 | 0.1 |
| UV stabiliser (d3) | % by wt. | 0.3 | 0.3 |
| UV stabiliser (d4) | % by wt. | 0.1 | — |
| TiO2-MB (d5) | % by wt. | — | 2 |
| Tests |  |  |  |
| Density | g/cm$^3$ | 0.99 | 0.92 |
| Modulus of elasticity in tension | MPa | 1,880 | 1,820 |
| Tearing strength | MPa | 49 | 34 |
| Breaking elongation | % | 7 | 16 |
| Impact strength, Charpy 23° C. | kJ/m2 | 54 | — |
| Notch impact strength, Charpy 23° C. | kJ/m2 | — | 4 |

The invention claimed is:

1. A polyamide moulding compound consisting of
(a) 54 to 79.7% by weight, relative to the sum of components (a) to (d) of a mixture of an amorphous or microcrystalline polyamide and a partially crystalline polyamide,
(b) 10 to 30% by weight, relative to the sum of components (a) to (d), of at least one impact modifier having a density of at most 0.915 g/cm$^3$,
(c) 5 to 20% by weight, relative to the sum of components (a) to (d), of hollow glass balls having a pressure resistance of at least 100 MPa measured according to ASTM D 3102-72 in glycerine, and
(d) 0 to 15% by weight, relative to the sum of components (a) to (d), of further additives,
components (a) to (d) adding up to 100% by weight;
wherein the polyamide moulding compound has (i) a density of at most 0.945 g/cm$^3$, (ii) a tensile strength of 22 to 56 MPa and a breaking elongation of 4 to 160%, according to ISO 527, and (iii) a Charpy Impact Strength of 33 to 115 kJ/m$^2$ according to ISO 179;
wherein component (a) is a mixture of PA 12 and PA MACM12;
wherein component (b) is selected from the group consisting of styrene-ethylene/butylene-styrene block copolymer grafted with maleic anhydride, ethylene-1-butene copolymer grafted with maleic anhydride, a blend of ethylene-propylene copolymer and ethylene-but-1-ene copolymer wherein one or both copolymers of said blend is/are grafted with maleic anhydride, and combinations thereof;
and
wherein the additives are selected from the group consisting of inorganic stabilisers, organic stabilisers, antiozonants, light-protecting means, UV stabilisers, UV absorbers or UV blockers, IR absorbers, NIR absorbers, anti-blocking agents, nucleation agents, crystallisation accelerators, crystallisation retardants, condensation catalysts, chain regulators, defoamers, chain-lengthening additives, conductivity additives, separation means, lubricants, marking agents, organic pigments, carbon black, graphite, carbon nanotubes, graphene, carbon fibres, photochromic agents, anti-static agents, mould-release agents, optical brighteners, halogen-free flame retardants, metallic flakes, metal-coated particles, filling- and reinforcing materials, natural layer silicates, synthetic layer silicates, and mixtures thereof.

2. The polyamide moulding compound according to claim 1, wherein component (a) has a density of at most 1.220 g/cm$^3$.

3. The polyamide moulding compound according to claim 1 wherein the amount of component (a) in the moulding compound ranges from 57 to 79% by weight relative to the sum of components (a) to (d).

4. The polyamide moulding compound according to claim 1, wherein the at least one impact modifier has a density of at most 0.910 g/cm$^3$.

5. The polyamide moulding compound according to claim 1 wherein the amount of the hollow glass balls (c) in the moulding compound ranges from 10 to 20% by weight relative to the sum of components (a) to (d).

6. The polyamide moulding compound according to claim 1, wherein the hollow glass balls have a pressure resistance of at least 110 MPa.

7. A moulded article or a coated moulded article comprising a polyamide moulding compound according to claim 1.

8. The moulded article of claim 7, which is selected from foils, profiles, pipes, containers, semi-finished products, finished parts, and hollow articles.

9. The polyamide moulding compound according to claim 1, wherein component (a) has a density of 1.01 to 1.06 g/cm$^3$.

10. The polyamide moulding compound according to claim 9, wherein the hollow glass balls have a pressure resistance of at least 110 MPa.

\* \* \* \* \*